(No Model.) 3 Sheets—Sheet 2.
G. F. BALLOU.
GEAR CUTTING DEVICE FOR LATHES.
No. 359,377. Patented Mar. 15, 1887.
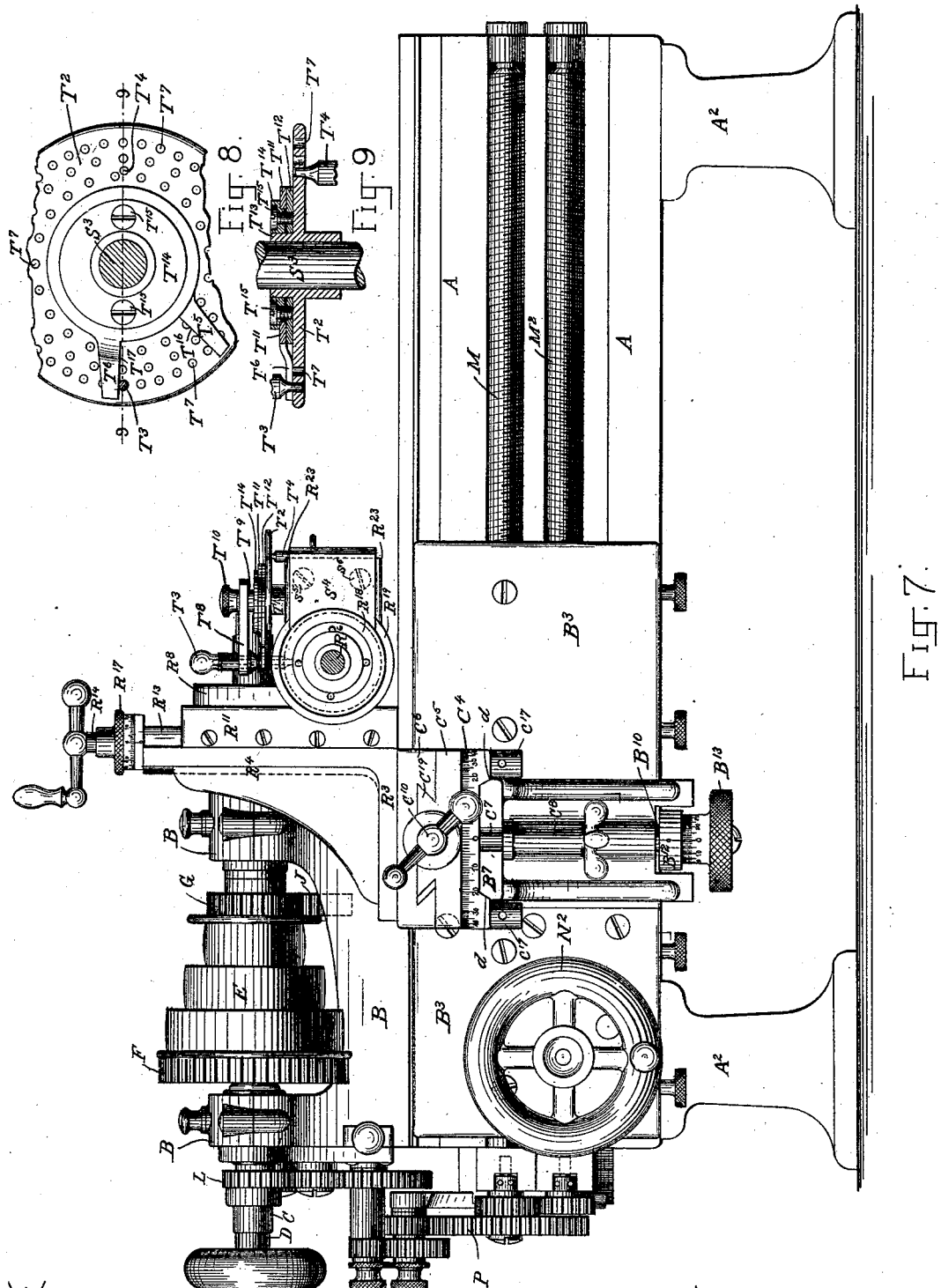
WITNESSES
John F. Nelson.
Kate E. Bellows.
INVENTOR
George F. Ballou
by his Attys
Brown Bros.

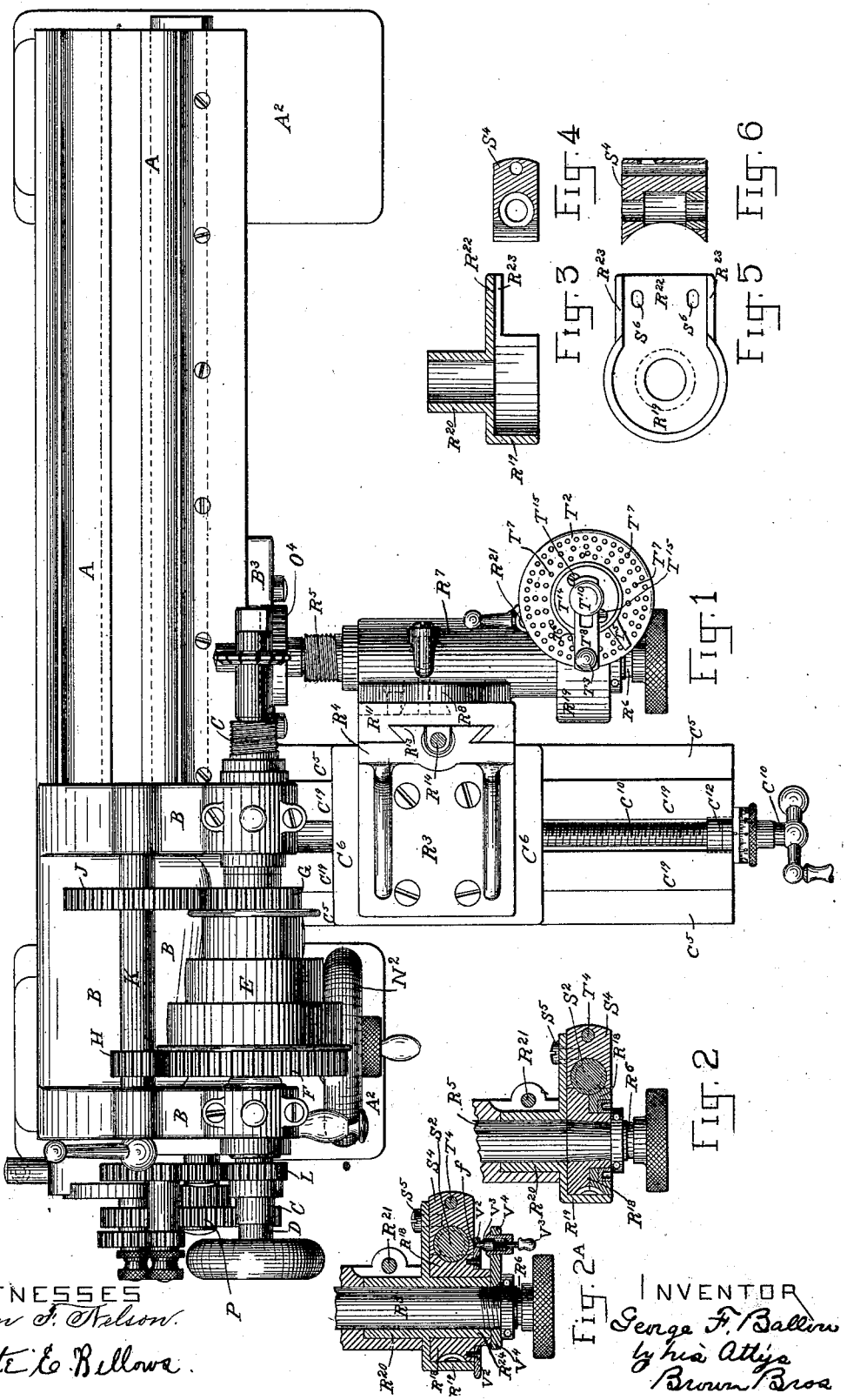

(No Model.) 3 Sheets—Sheet 3.
G. F. BALLOU.
GEAR CUTTING DEVICE FOR LATHES.
No. 359,377. Patented Mar. 15, 1887.
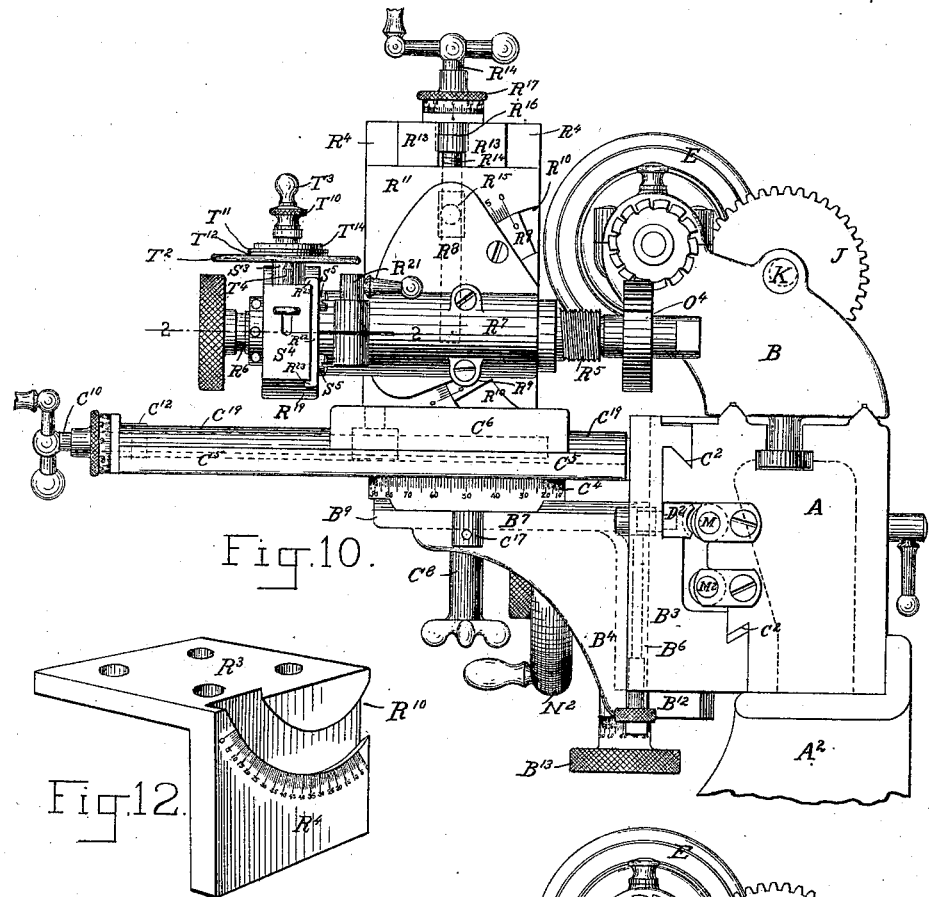
Fig. 10.
Fig. 12.
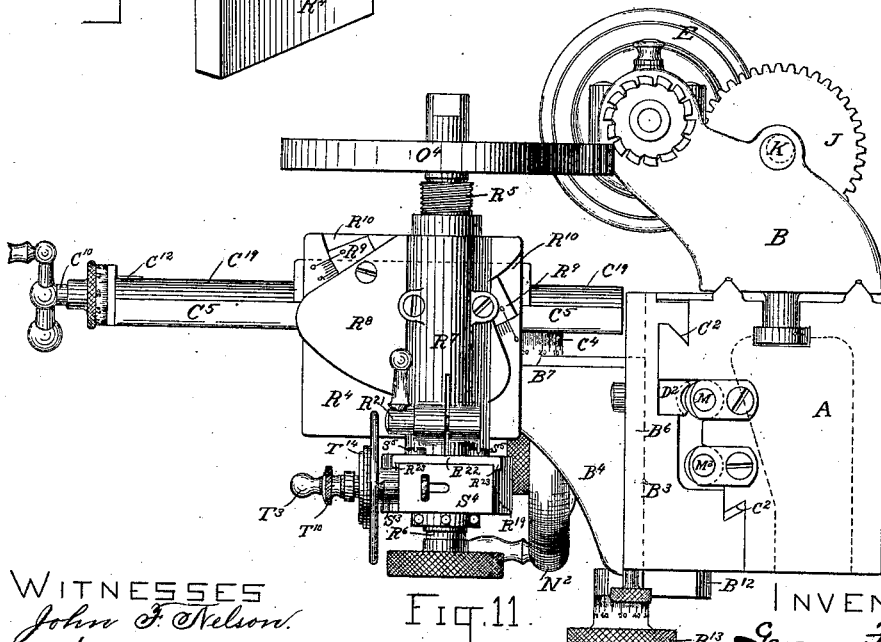
Fig. 11.
WITNESSES
John F. Nelson
Kate E. Billows
INVENTOR
George F. Ballou
by his attys
Brown Bros

UNITED STATES PATENT OFFICE.

GEORGE F. BALLOU, OF WALTHAM, MASSACHUSETTS.

GEAR-CUTTING DEVICE FOR LATHES.

SPECIFICATION forming part of Letters Patent No. 359,377, dated March 15, 1887.

Application filed June 9, 1886. Serial No. 204,621. (No model.)

*To all whom it may concern:*

Be it known that I, GEORGE F. BALLOU, of Waltham, in the county of Middlesex and State of Massachusetts, have invented certain new and useful Improvements in Milling-Fixtures for Slide-Lathes, of which the following is a full, clear, and exact description.

This invention relates to a fixture to be used in slide-lathes for milling and such like work, and the milling-fixture of this invention is more particularly designed and intended for use in a slide-lathe of the general construction and arrangement of its parts, and more especially of its slide-carriage and slide-rest, fully shown and described in a separate application for Letters Patent of the United States of even date herewith, filed June 9, 1886, Serial No. 204,624; but, as will be obvious from the description which hereinafter follows, the fixture is adapted to be used in slide-lathes and with slide-carriages and slide-rests of other constructions and arrangements of parts.

The milling-fixture of this invention is more especially intended for use in cutting gear-teeth, grooves, &c., and in doing other work of like nature requiring, as well known, an index attachment, and it is more particularly adapted for use in a slide-lathe constructed and arranged for the reception and movement of the fixture horizontally along and also transversely and vertically in relation to the length of the lathe-bed or shears.

This invention, in substance, consists, first, in a milling-fixture for slide-lathes having a work-carrying arbor or spindle suitably arranged to be turned from time to time in its bearings, of mechanism, substantially as hereinafter described, which is connected to said arbor for rotating it, and has its support adapted to be swung about the axis of the arbor and to be fastened against and set free for being so swung, and fastened to secure a turning of said arbor from the turning of said mechanism, and set free to enable said arbor and said mechanism connected therewith to be swung as one about the axis of said arbor.

It consists, second, in a milling-fixture for slide-lathes having a work-carrying arbor or spindle suitably arranged to be turned from time to time in its bearings, of mechanism, substantially as hereinafter described, which is connected to said arbor for rotating it, and has its support adapted to be swung about the axis of the arbor and to be fastened against and set free for being so swung, and fastened to secure a turning of said arbor from the turning of said mechanism, and set free to enable said arbor and said mechanism connected therewith to be swung as one about the axis of said arbor, in combination with an index mechanism, substantially as hereinafter described, in part directly secured to the work-carrying arbor or spindle and otherwise constructed and arranged for connecting said arbor with and disconnecting it from the mechanism provided for rotating said arbor, and which mechanism, as aforesaid, has its support adapted to be swung about the axis of the arbor, and otherwise is arranged as before stated.

It consists, third, in a milling-fixture for slide-lathes having a work-carrying arbor or spindle suitably arranged to be turned from time to time in its bearings, of an index mechanism, substantially as hereinafter described, which is connected to said arbor for rotating it, and has its support adapted to be swung about the axis of the arbor and to be fastened against and set free for being so swung, and fastened to secure a turning of said arbor from the turning of said index mechanism, and set free to enable said arbor and said index mechanism connected therewith to be swung as one about the axis of said arbor.

It consists, fourth, in a milling-fixture for slide-lathes having a work-carrying arbor or spindle suitably arranged to be turned from time to time in its bearings, of an index mechanism, substantially as hereinafter described, which is connected to said arbor for rotating it, and has its support adapted to be swung about the axis of the arbor and to be fastened against and set free for being so swung, and fastened to secure a turning of said arbor from the turning of said index mechanism, and set free to enable said arbor and said index mechanism connected therewith to be swung as one about the axis of said arbor, in combination with an index mechanism, substantially as hereinafter described, in part directly secured to the work-carrying arbor or spindle, and otherwise constructed and arranged for connecting said arbor with and disconnecting it from the index mechanism provided for rotating said arbor, and which latter index mechanism, as aforesaid, has its support adapted to be swung about the axis of the arbor, and otherwise is arranged as before stated.

It consists, fifth, in the combination, with a slide-rest for a slide-lathe composed of separate parts placed one upon another and severally constructed and applied to be adjusted upon each other in parallel planes and in directions both rectilinear and curvilinear, and for said movements to be made separately and independently of each other, of a work-carrying arbor or spindle arranged to be turned from time to time in bearings of said slide-rest, and a mechanism which is connected to said arbor for rotating it, and has its support adapted to be swung about the axis thereof and to be fastened against and set free for being so swung, and fastened to secure a turning of said arbor from the turning of said mechanism, and set free to enable said arbor and said mechanism connected therewith to be swung as one about the axis of said arbor, substantially as hereinafter described.

It consists, sixth, in a milling-fixture for slide-lathes having a work-carrying arbor or spindle suitably arranged to be turned in its bearings and a mechanism composed of a worm gear-wheel, of said arbor and a worm meshing with said worm-gear through which to rotate said arbor, and which has its support adapted to be swung about the axis thereof and to be fastened against and set free for being so swung, and fastened to secure a turning of said arbor from the turning of said mechanism, and set free to enable said arbor and said mechanism connected therewith to be swung as one about the axis of said arbor, in combination with an index mechanism connected with said operating mechanism for the work-carrying arbor and carried by its said support, and composed of an index-wheel which is free to be rotated on the arbor of said worm, and, for illustration, for its action as an index, provided with holes arranged in one or more circles concentric with the axis of rotation of said worm and at equal distances apart in each of said circles, a pin to hold and fasten said index-wheel against and to release it to rotation, a pin to act as an index-pin in connection with said index-wheel and which is attached to the arbor of said worm, and in its said attachment arranged to be engaged with and disengaged from a hole of the index-wheel, and preferably adjustable as to its distance from the axis of said arbor, and jaws which are adapted to be opened from each other and, so opened, fastened against accidental displacement, and also are arranged to be swung about the axis of said index-wheel and otherwise so properly adjusted in relation to said index-pin as to regulate and determine from the movement of the index-wheel the rotation in fractional parts of a rotation of said operating-worm for the work-carrying arbor, and all otherwise, substantially as hereinafter described.

It consists, seventh, of a slide-rest for a slide-lathe, composed of separate parts placed one upon another and severally constructed and applied together to be adjusted upon each other in parallel planes and in directions both rectilinear and curvilinear, and for said movements to be made separately and independently of each other, in combination with a work-carrying arbor or spindle suitably arranged to be turned from time to time in its bearings, and mechanism which is connected to said arbor for rotating it and has its support adapted to be swung about the axis thereof and to be fastened against and set free for being so swung, and fastened to secure a turning of said arbor from the turning of said mechanism, and set free to enable said arbor and said mechanism connected therewith to be swung as one about the axis of said arbor, substantially as hereinafter described.

In addition to the above, and which are the main features making up the present invention, this invention consists in other improvements in detail, and, among other things, in the construction of the spacing-jaws of the index milling mechanism for being fastened in their adjusted position, and all as hereinafter fully described.

In the accompanying drawings, forming a part of this specification, the improved fixture of this invention for milling and such like purposes is illustrated as applied to a slide-lathe having the features of construction, and also to a slide-carriage and a slide-rest, all as fully described and shown in the application for Letters Patent of the United States hereinbefore referred to, and which of themselves form no part of the present invention.

Plate 1, Figure 1, is a plan view of the slide-lathe and said fixture. Fig. 2 is a sectional view in detail in the direction of line 2 2, Fig. 10, and Fig. 2ᴬ is a sectional view similar to Fig. 2, but illustrating index mechanism as applied directly to the work-carrying arbor or spindle of the fixture. Figs. 3, 4, 5, and 6 are views in detail, hereinafter referred to, of parts shown detached and in section, Fig. 2.

Plate 2, Fig. 7, is a front elevation of the slide-lathe and index milling-fixture, as shown in plan, Fig. 1. Fig. 8 is plan view enlarged of the index-wheel and spacing-jaws of the index milling-fixture and in parts broken away. Fig. 9 is a vertical section on line 9 9, Fig. 8.

Plate 3, Fig. 10, is an elevation of the lathe-bed, head-stock, and index milling-fixture from the tail-stock end of the lathe, the tail-stock being removed. Fig. 11 is a similar view to Fig. 10, but illustrating the index milling-fixture in a position at right angles to its position shown in the previous figures, and as will hereinafter more fully appear. Fig. 12 is a perspective view of the part of the index milling-fixture for suspending it, as a whole, upon the slide-rest of the slide-lathe and in the position shown in Fig. 11.

In the drawings, A represents the lathe-bed or shears supported at each end on legs A², and B is the stationary head-stock at one end thereof.

C is a horizontal arbor mounted and turning in the head-stock B and interiorly carrying a lathe-spindle or mandrel, D, for chucking or otherwise securing a tool or a piece of work thereto and through it to the arbor of head-stock, all as well known.

E is a cone-pulley of varying diameters and loose, but suitably laterally confined, and F is a gear-wheel fixed on the arbor C and adapted, in any suitable manner, to be locked with and unlocked from the cone-pulley.

G is a gear-wheel on cone-pulley E, and H and J are two gear-wheels which mesh, respectively, with gear-wheel F of lathe-arbor C of head-stock and gear-wheel G of cone-pulley E, and are both mounted on a common horizontal shaft, K, which is back of the arbor C, and turns in bearings of the head-stock, and otherwise is arranged as usual to be adjusted to place its gear-wheels H J in and out of mesh with the gear-wheels F G of arbor C and cone-pulley E.

L is a pinion gear-wheel on lathe-arbor C, and this pinion is connected to the gear-wheel P of a leading-screw, M, through the train of gearing and other mechanism shown in the drawings, and all as fully described in the application hereinbefore referred to, and to which reference is hereby had for a particular description thereof, and whereby said leading-screw M, from the rotation of the lathe-arbor, can be rotated in either direction and, again, from the rotation of the leading-screw M a parallel leading-screw, M², below and geared with it, can be also similarly rotated in either direction. This train of gearing and said mechanism form no part of this invention.

The rotation of the leading-screws M M² is for the purpose of moving a slide-carriage lengthwise along the front cheek of the lathe-bed or shears, and which carriage is suitably constructed therefor, and the upper leading-screw, M, which is for fine work, connects with sectional or half screw-nuts D² of the slide-carriage, and the lower leading-screw, M², which is for general work, connects with the slide-carriage by mechanism consisting, among other parts, of a hand-wheel, N², and otherwise, all as fully described and shown in the application aforesaid, and the whole such as to enable the slide-carriage to be moved lengthwise of the lathe-bed, in either direction, and either from the action of the driving mechanism of the lathe or by the hand-wheel, and also to enable the speed of such movement to be varied and adjusted and either of the leading-screws to be brought into action upon the slide-carriage, and all as is fully shown and set forth in the application aforesaid. These several parts and their combination and arrangement, as above referred to, form of themselves no part of this invention, and so it is not deemed necessary to herein further describe them.

The slide-carriage is in two parts—to wit, a vertical plate or block, B³, with a front flat face and a back face of angular shape to fit a corresponding angular-shaped guideway, C², therefor of the front cheek of the lathe-bed and bracket, with an upright portion, B⁴, arranged to move vertically in a dovetail way, B⁶, of the front face of the block B³, and a horizontal arm or table, B⁷, which projects from the upper end of said upright B⁴ and at right angles to the length of the slide-carriage, and is made of fork shape and preferably with the space between its tines open at the front end, B⁹.

The bracket B⁴ B⁷ is vertically adjustable on the slide-carriage through the turning of a vertical screw-rod, B¹⁰, engaging with the vertical screw-nut portion B¹¹ of the bracket, and turning loosely within a horizontal bearing-block, B¹², of the slide-carriage, and therein confined against lengthwise movement in any suitable manner. This screw-rod B¹⁰, by which to adjust the bracket B⁴ B⁷ vertically, as above stated, has at its lower end a milled head, B¹³, peripherally and properly graduated in one hundred equal parts or divisions, each representing a one-thousandth of an inch and figured for the rise and fall of the bracket from the turning of said screw to be measured and determined in one-thousandth parts of an inch, using a suitable index-mark at the front side of the bearing-block B¹² of the screw-rod.

The vertically-adjustable bracket B⁴ B⁷ of slide-carriage supports and carries a slide-rest in three separate parts or slides, C⁴ C⁵ C⁶, placed upon each other, and the lower slide, C⁴, of the series upon the flaring ways d of the horizontal arm B⁷ of the bracket, and which it fits by its correspondingly-shaped flaring ways, and to which it is bound by a screw-bolt, C⁷, depending from its under side and passing between the tines of the horizontal arm B⁷, and on under side of said arm receiving a screw or thumb nut, C⁸. The vertical edge of slide C⁴ is circular and marked off into graduations representing the degrees of a circle. Slide C⁵, the slide next above and resting on slide C⁴, has an index-mark for use with the graduations of slide C⁴, and it is arranged to swing in a horizontal plane around a vertical central pintle (not shown) of slide C⁴, and to be secured against accidental escape from said pintle by the engagement of the T-head of screw-bolts (not shown) with a circular groove (not shown) of corresponding T shape in its under side, and which bolts pass loosely through the thickness of slide C⁴, and on the under side of said slide have screw-nuts C¹⁷ screwed on them, and which, on being turned up, fasten slides C⁴ and C⁵ together and against movement. Slide C⁶, the upper of the series of slides, has a dovetail way or groove in its under side, and this groove engages a similar dovetail projection, C¹⁹, on the upper side of slide C⁵ next below, and which, as described, is arranged to swing on a center pintle of slide C⁴, directly supporting it and resting directly on the vertically-adjustable bracket of the slide-carriage, as described.

C¹⁰ is a horizontal screw-rod engaging with a stationary screw-nut (not shown) of slide C⁵, and turning loosely in a bearing-block, C¹², confined on slide C⁵, and constructed in separate parts attached together and to the slide, (not shown,) and for the same purpose and otherwise, all as fully described in the application aforesaid. The turning of the horizontal screw-rod C¹⁰ in either direction moves slide C⁶ forward and backward on slide C⁵, and having loosened the fastening screw-nuts of the screw-bolts of slides C⁴ and C⁵ from their bearings on slide C¹, slide C⁵ is made free to be swung around on the center pintle of slide C⁴, and thus from these two movements adjustments of the slide-rest in a horizontal plane and in both a rectilinear and a curvilinear direction can be made, and each adjustment is separate and independent of the other.

The slide-rest just described has the index-milling-fixture of this invention, to be now described, attached to its upper slide, C⁶, through a plate, R³, which is bolted to said slide C⁶, and has a right-angled vertical extension, R⁴, that, as shown, makes the support proper for the several working and stationary parts of the milling-fixture; and in Figs. 1, 7, and 10 this vertical extension is shown as constructed, and, as hereinafter described, for a vertical rectilinear adjustment of the milling-fixture thereon, and in Fig. 11 as without such feature of construction for vertical adjustment.

The milling-fixture proper of this invention in its part to receive and fasten a piece of work—such, for instance, as a wheel, O⁴, for teeth to be cut across its edge, or a tool (not shown)—thereto, and as the same is shown, can be the ordinary work or tool holding arbor and mandrel or spindle construction used in the head-stock of slide-lathes; and this part, of itself, forms no part of this invention, and therefore it is deemed sufficient to describe it only generally, R⁵ being the hollow arbor and R⁶ the mandrel or spindle in hollow arbor R⁵, and O⁴ the work—a blank wheel, as before stated—secured to the arbor, and all as well known.

R⁷ is a tube, making the bearing for the hollow and work-carrying arbor R⁵, and in which it is free to turn, but is confined against lengthwise movement in said bearing by shoulders at its opposite ends, and which bear against the opposite ends of the tubular bearing R⁷. This tubular bearing for the work-carrying arbor projects from and is suitably attached to one face of a flat plate, R⁸, provided on its opposite face with a bar or rib, R⁹, which, in cross-section, is of dovetail shape, and along its length from end to end regularly curving, with the center of the curve coincident with the axial line of the work-carrying arbor, and fits within a corresponding dovetail and curvilinear-shaped way, R¹⁰, of a vertical slide, R¹¹, which, as the milling-fixture is shown in Figs. 1, 7, and 10, makes a part, but is separate from and attached to be vertically adjusted, as hereinafter described, to the plate-support proper, R³ R⁴, for the milling-fixture on the slide-rest described, and in the fixture, as shown, Fig. 11, the vertical slide R¹¹ of Figs. 1, 7, and 10 is dispensed with, and the curvilinear way R¹⁰ is in supporting-plate R⁴, attached to slide-rest. The circular groove or way R¹⁰ at and along its outer edge is marked off with radial graduations, to be used with an index-mark of the dovetail rib or bar R⁹ fitting the same, and which carries the tubular bearing R⁷ for the work-carrying arbor, for regulating and determining with accuracy the vertical angular adjustment of the work-carrying arbor in relation to the axis of the lathe-arbor C, as will hereinafter more fully appear.

The plate R⁸, carrying tubular bearing R⁷ for the work-carrying arbor R⁵, is fastened to the dovetail rib R⁹ by screws R¹², which pass loosely through it and screw into said rib, and it laps over and upon the plate R⁴, Figs. 11, 12, or plate or slide R¹¹, Fig. 10, as the case may be, having dovetail groove R¹⁰, and at each side of said groove, and the whole so that the tubular bearing R⁷ for the work-carrying arbor can be rigidly bound to and loosened from said plate R⁴ or R¹¹, as the case may be. The vertical slide R¹¹, carrying the tubular bearing R⁷, Figs. 1, 7, and 10, has a vertical dovetail groove fitting a corresponding dovetail projection, R¹³, of the plate R⁴, to which the plate R⁸, having the tubular bearing R⁷, is secured, and the slide R¹¹ is raised or lowered by the turning of a vertical screw shaft or rod, R¹⁴, working in a screw-nut, R¹⁵, of the slide and turning loosely in a bearing-block, R¹⁶, of the vertical plate R⁴.

The bearing-block R¹⁶ for the operating-screw R¹⁴ is in parts, one secured to the vertical plate R⁴ and the two secured together and relatively constructed and arranged to hold the screw against lengthwise movement through it. The operating-screw R¹⁴ has a milled head, R¹⁷, peripherally graduated, to be used in connection with a stationary index-mark of the vertical plate R⁴, all for the purpose of accurately regulating and determining the vertical adjustments by the turning of the operating-screw R¹⁴ of the work-carrying arbor R⁵ in relation to the horizontal plane of the axis of the lathe-arbor C. The graduations referred to are such as to divide the edge of the milled head R¹⁷ into one hundred equal parts or divisions, each representing a one-thousandth of an inch, and figured for the rise and fall of the work-carrying arbor R⁵, for the turning of said screw to be measured, and determined in one-thousandth parts of an inch, using therewith the index-mark before referred to.

R¹⁸ is a worm gear-wheel keyed or otherwise secured to one end of the work-carrying arbor R⁵ of the milling-fixture, and R¹⁹ is a shell about the working edge of the worm gear-wheel $R^{18}$, and $R^{20}$ is a sleeve-extension of shell $R^{19}$, loosely surrounding work-carrying arbor $R^5$ and fitting loosely within one and a split end of the tubular bearing $R^7$ for said arbor, provided with a screw, $R^{21}$, adapted to be turned up to set said so split tubular bearing $R^7$ tightly about and against said sleeve, and thus to fasten said sleeve and shell $R^{19}$, of which it is an extension, to or to release them from the tubular bearing $R^7$ of the work-carrying arbor $R^5$, as and for a purpose as will hereinafter appear.

The worm gear-wheel $R^{18}$, before referred to, is engaged by a worm, $S^2$, of an arbor or spindle, $S^3$, turning in suitable bearings of a block, $S^4$, fitting within the rectilinear projecting portion $R^{22}$, at one side of the shell $R^{19}$, surrounding the working edge and covering the inner end or face of the worm gear-wheel $R^{18}$, as before stated. The axis of the worm-carrying arbor $S^3$ is at one side of and in a line running at right angles to the axis of the work-carrying arbor $R^5$.

The block $S^4$, carrying worm-arbor $S^3$, as described, is fastened in the rectilinear portion of the shell by set-screws $S^5$, which pass loosely through slots $S^6$ in the side walls of said shell $R^{19}$ and screw into the block $S^4$, and with these screws loosened the block can then be moved in the shell to place the worm $S^2$ of the arbor $S^3$ into or out of engagement with the worm gear-wheel $R^{18}$, or to compensate for wear between said worm and worm-gear; and in order that this movement may be positive and straight, the shell-extension $R^{22}$ has guide-ribs $R^{23}$, to act in conjunction with the opposite sides of the block $S^4$.

With the worm $S^2$ of arbor $S^3$, engaged with the worm gear-wheel $R^{18}$ of the work-carrying arbor $R^5$, a rotation of the worm-arbor $S^3$ rotates the work-carrying arbor; and for the purpose of so rotating the said work-carrying arbor in definite steps or fractional parts of a whole rotation, and thus to present the work which is carried by it in regular steps to the action of a tool or cutter—as, for instance, a rotary cutter carried by the lathe-arbor C—said worm-arbor is provided with what is known as an "index mechanism," consisting, as shown, in substance, of an index-wheel, $T^2$, an index-pin, $T^3$, and a stop-pin, $T^4$, both to be engaged with the index-wheel, and adjustable jaws $T^5$ $T^6$, for spacing the distance to which the index-wheel may be rotated for a fractional part of its whole rotation, all as now described.

The index-wheel $T^2$ is loose on the worm-arbor $S^3$, but suitably confined against moving lengthwise thereon, and, as shown, it is provided with three series of holes or sockets, $T^7$, in its thickness, and the several series are arranged in separate circles severally concentric with the axis of the worm arbor $S^3$, and the holes of each series are at equal distances apart; but the distances in the one circle either may be the same or may vary as compared with the distance in the other circles.

The index-pin $T^3$ is at the outer end of a radial arm, $T^8$, slotted in its length and setting by such slot over and upon a shoulder, $T^9$, of the worm-arbor $S^3$ and thereto fastened by a thumb-screw, $T^{10}$, screwing therein, by all of which the index-pin $T^3$ is capable of being set at the proper distance from the axis of the worm-arbor $S^3$ for the engagement with the holes of either circle of holes $T^7$ of the series of circles of holes in the index-wheel $T^2$.

The stop-pin $T^4$ is carried by the block $S^4$, in which the worm-arbor turns, and it is arranged to be slid therein into and out of engagement with a hole of the inner circle of the series of circles of holes of the index-wheel $T^2$.

The spacing-jaws $T^5$ $T^6$ are radial with the axis of the worm-arbor $S^3$, and each jaw is carried by a separate collar, $T^{11}$ $T^{12}$, respectively. The collar $T^{12}$ loosely surrounds a sleeve-bearing, $T^{13}$, of the loose index-wheel on the worm-arbor $S^3$ and the collar $T^{11}$, a separate ring, $T^{14}$, in turn loosely surrounding said sleeve-bearing $T^{13}$ of the loose index-wheel. The loose ring $T^{14}$ laps over and rests upon the face of the collar $T^{11}$ of the spacing-jaw $T^6$, which in turn rests upon the collar $T^{12}$, and by screws $T^{15}$, entered through loose ring $T^{14}$ and screwed into and out of collar $T^{12}$, the jaw-collars, in the first instance, will be rigidly fastened together, with the edges $T^{16}$ $T^{17}$ of the jaws at any given position relative to each other, and in the second instance will be loosened for changing the position of the edges of the jaws, as may be desired, and then the jaws fastened and secured against accidental displacement by tightening up said set-screws. By this means the spacing-jaws can be adjusted to include between their edges $T^{16}$ $T^{17}$ a greater or less number of holes in any of the circles of holes before referred to in the index-wheel, and thereby made to definitely determine and insure a regularity of step-by-step movement of the worm-arbor $S^2$, and through it of the work on the work-carrying arbor $R^5$ in the use, as will hereinafter appear, of the index mechanism, of which they form a part.

So far as has been described the work-carrying arbor $R^5$ and its worm-gear $R^{18}$ are directly attached together. As shown, however, in Fig. $2^A$, the worm-gear $R^{18}$ is not directly attached to the work-carrying arbor, but, on the contrary, it is loose upon an extension, $R^{24}$, of the loose sleeve $R^{20}$ of the arbor, and it has an index-wheel, $V^2$, secured to it, having a series of equidistant sockets or holes, $f$, arranged in a circle concentric with its axis and in its thickness, to be engaged by an index-pin, $V^3$, of a radial arm, $V^4$, fixed to the work-carrying arbor, and said index-pin engaging with the index-wheel fastens arbor $R^5$ and worm-gear $R^{18}$ together.

The index mechanism just above described is an index mechanism separate and independent of the index mechanism before described, and connected to the work-carrying arbor through the worm $S^2$ on an arbor, $S^3$, and which meshes with the worm-gear $R^{18}$ of work-carrying arbor. This independent index mechanism constitutes a feature of this invention, as before stated, and, if so desired, spacing-jaws, such as the spacing-jaws $T^5 T^6$, before referred to, of the index-wheel $T^2$ and its index-pin $T^3$, may be provided for its index-wheel $V^2$ and its index-pin $V^3$.

As appears from the description given, the index milling-fixture of this invention has two separate and distinct index mechanisms—one applied to operate directly on and the other applied to operate indirectly on and through mechanism connected with the work-carrying arbor. The directly-operating index mechanism is shown in Fig. 2$^A$ only. Either of the index mechanisms alone or both index mechanisms may be used, as the work to be milled may require. Using the direct-operating index mechanism, the spacing of the work of the work-carrying arbor for being correspondingly cut or marked with the tool of the lathe-arbor can be done by directly turning the work-carrying arbor with the arm $V^4$ of the index-pin $V^3$ of such mechanism step by step—as, for instance, at each step—the distance between two of the holes of the index-wheel or between every other or any other number of its holes, and then holding the work-carrying arbor in its so adjusted position by locking said index-pin with the proper hole of its said index-wheel while the work carried by it is being cut or marked with the tool of the lathe-arbor. In this manner the work can be spaced and cut or marked at spaces corresponding in number either to the spaces covered by the separate holes or by any desired combination of two or more of the holes of the index-wheel at each step-by-step movement of the index-pin, and a spacing of the work also may be secured, either at regular distances apart or at irregular distances apart as to one another, but at regular distances as to the unit of division of the index-wheel, according as the index-pin is advanced regularly or irregularly around and engaged with the holes of the index-wheel, as has been stated. Using the indirect-operating mechanism, the spacing of the work of the work-carrying arbor for being correspondingly cut or marked with the tool of the lathe-arbor can be done by turning with the arm $T^8$ of the index-pin $T^3$ of such mechanism, the arbor $S^3$ of the worm $S^2$ meshing the worm-gear $R^{18}$ of the work-carrying arbor $R^5$ step by step—as, for instance, the distance between two of the holes of the index-wheel or between every other or any other number of its holes—and then securing the work-carrying arbor in position by locking said pin with the proper hole of the index-wheel while the work carried by it is being cut or marked with the tool of the lathe-arbor. In this spacing of the work under a given division of the index-wheel $T^2$ into holes—as, for instance, into sixty holes—in any given one of its circle of holes, as described, at equal distances apart, and with a given relation of worm $S^2$ of arbor $S^3$ to worm-gear $R^{18}$ of work-carrying arbor $R^5$—as, for instance, one to sixty—then the movement of the worm-arbor $S^3$, by means of the arm $T^8$ of index-pin $T^3$ of index-wheel $T^2$, from one hole to another of said wheel moves said work-carrying arbor a one three-hundred-and-sixtieth part of its circle of rotation, correspondingly spacing the work carried by it; and, again, a similar movement of the worm-arbor through a space covered by any desired combination of two or more of said holes of the index-wheel, and which movement through such spaces may be made regular or irregular as to the number of holes at any one given movement, moves said work-carrying arbor a corresponding number of one three-hundred-and-sixtieth part of its circle of rotation, and securing thereby a corresponding spacing of the work which it carries. After each movement, step by step, of the worm-arbor $S^3$, as above stated, the worm-arbor is fixed in position by inserting the index-pin $T^3$ in the proper hole of the index-wheel. In this operation of the index mechanism connected with the arbor $S^3$ of the worm $S^2$, meshing with the worm-gear $R^{18}$ of the work-carrying arbor, the index-wheel $T^2$ of such mechanism is held stationary by the engagement of the stop or holding pin $T^4$ of the bearing-block $S^4$ for said worm-arbor $S^3$ with a hole of its series of holes, and which hole may be, as shown, one of the holes in either of its circles of holes, or a hole separate from and independent of any of such circles of holes, and which are the holes to be used for index milling purposes, as has been described; and, again, the tubular bearing $R^7$, split at one end, as explained, is made fast to the sleeve $R^{19}$, surrounding the work-carrying arbor, and thus the parts for the turning of the work-carrying arbor from the turning of the arbor $S^3$ of the worm $S^2$ by the movement of the index-pin of the index mechanism indirectly connected to the work-carrying arbor, as has been described, are made suitable for the turning of the work-carrying arbor.

The direct-operating index mechanism enables the connection between work-carrying arbor and its worm-wheel $R^{18}$ to be changed from time to time in relation to the then position of the indirect-operating index mechanism as to the work-carrying arbor, and as the two index mechanisms are capable of separate and independent operations, as described, by using the two index mechanisms in combination one with the other, errors, should any exist in said mechanisms, can be broken up and distributed through the several spaces into which the work is being cut, or marked with the tool of the lathe-arbor, and in a manner to be practically eliminated or rendered nugatory in so far as apparently or practically to affect the regularity or irregularity in distances, as before stated, of the spaces aimed at in the work. This result—that is, the elimination practically of existing errors in the index mechanisms—is secured by using one of the index mechanisms—as, for instance, either the direct-operating index mechanism or the indirect-operating mechanism, but preferably the latter—as the means of spacing the work into the desired number of spaces, and the other as the means of setting the work on the work-carrying arbor from time to time during said spacing, either forward or backward, any given number—as, for instance, one, two, or more—of its separate spaces, and then proceeding, using the other index mechanism to move the work forward or backward, step by step, as desired, and so on until the work has been divided or spaced off into the whole number of spaces desired. In this operation and use of the index mechanisms the work is spaced first with the index mechanism—as, for illustration, the indirect-operating index mechanism, with which it is spaced into the desired number of spaces—into a number of spaces less than and of which the total number of spaces is a multiple, and, having completed one turn of the work, the work is then moved either forward or backward a space or spaces—as, for instance, one or two or more of its separate spaces—with the direct-operating index mechanism, and then the spacing of the work proceeded with, as before, using the indirect-operating index mechanism for another complete turn of the work, after which the work is again moved, as before, a space or spaces—as, for instance, one, two, or more of its separate spaces—with the direct-operating index mechanism, followed by again spacing with the indirect index mechanism, as before, and so on, until the desired number of spaces is obtained.

For a use of the two index mechanisms in combination, as above stated, the index-wheels either should be both adapted to an equal number of divisions or spaces or the index-wheel of the index mechanism by which the work is moved forward or backward, as described, in relation to the index mechanism through which the full spacing of the work is secured should be adapted for a movement of the work through a space or spaces of which the total number of spaces to be obtained is a multiple.

Loosening the split tubular bearing $R^7$ from and about the sleeve $R^{19}$, inclosed within it and surrounding the work-carrying arbor, sets the indirect index mechanism, and all of which is carried by said sleeve, as described, free to be swung, as a whole and with the work-carrying arbor $R^5$, around the axis of said arbor as a center, and thus a given point of the work which is on said arbor can be brought and presented to the tool of the lathe without requiring the index mechanism to be changed and irrespective of the divisions of the index-wheel, and whether or not such point of the work is then coincident therewith.

The index milling-fixture, slide-rest, and slide-carriage, severally constructed and arranged together and combined with a lathe-bed or shears, all substantially as described, enable, as is plain, the work on the work-carrying arbor $R^5$ of the fixture to be presented to the tool of the lathe in any and all angles desired, and, within given limits, in any and all horizontal and vertical planes.

The index milling-fixture of this invention is most serviceable as a means of regularly moving work to graduate or divide it into equal parts, and most especially so with a graduating-machine of my invention, and for which I have, of even date herewith, executed the necessary papers for an application for Letters Patent of the United States.

Having thus described my invention, what I claim, and desire to secure by Letters Patent, is—

1. In a milling-fixture for slide-lathes, the combination, with a rotatory work-carrying arbor and mechanism, substantially such as described, for rotating said arbor, of a support for said mechanism adapted to be swung and capable of making a complete and uninterrupted rotation about the axis of said arbor, and to be fastened against and set free for being so swung, substantially as described, for the purposes specified.

2. In a milling-fixture for slide-lathes, the combination, with a rotatory work-carrying arbor, mechanism, substantially such as described, for rotating said arbor, and a support for said mechanism adapted to be swung about the axis of said arbor and to be fastened against and set free for being so swung, of an index mechanism, substantially such as described, in part directly secured to said arbor and constructed and arranged to connect said arbor with and disconnect it from the operating mechanism for said arbor, substantially as described, for the purposes specified.

3. In a milling-fixture for slide-lathes, the combination, with a rotatory work-carrying arbor and an index mechanism, substantially as described, for rotating said arbor, of a support for said mechanism adapted to be swung about the axis of said arbor and to be fastened against and set free for being so swung, substantially as described, for the purposes specified.

4. In a milling-fixture for slide-lathes, the combination, with a rotatory work-carrying arbor, an index mechanism, substantially such as described, for rotating said arbor, and a support for said mechanism adapted to be swung about the axis of said arbor and to be fastened against and set free for being so swung, of an index mechanism, substantially such as described, in part directly secured to said arbor and constructed and arranged to connect said arbor with and disconnect it from the operating mechanism for said arbor, substantially as described, for the purposes specified.

5. The combination, with a milling-fixture for slide-lathes composed of a rotatory work-carrying arbor, mechanism, substantially such as described, for rotating said arbor, and a support for said mechanism adapted to be swung about the axis of said arbor and to be fastened against and set free for being so swung, of a slide-rest composed of separate parts placed one upon another and severally constructed and applied to be adjusted upon each other in parallel planes and in directions both rectilinear and curvilinear and for said movements to be made separately and independently of each other, substantially as described, for the purpose specified.

6. The combination, with a milling-fixture for slide-lathes, composed of a rotatory work-carrying arbor, mechanism, substantially such as described, for rotating said arbor, and a support for said mechanism adapted to be swung about the axis of said arbor and to be fastened against and set free for being so swung, of a slide-rest composed of separate parts placed one upon another and severally constructed and applied to be adjusted upon each other in parallel planes and in directions both rectilinear and curvilinear and for said movements to be made separately and independently of each other, a slide-carriage for said slide-rest adapted to be adjusted vertically, a lathe-bed or shears for said slide-carriage, and mechanism to move said slide-carriage along said lathe-bed, substantially as described, for the purposes specified.

7. In a milling-fixture for slide-lathes, the combination, with a rotatory work-carrying arbor and mechanism, substantially such as described, for rotating said arbor, a support for said mechanism which is adapted to be swung about the axis of said arbor and to be fastened against and set free for being so swung, and a support for said arbor adapted to be adjusted in a vertical plane in both a rectilinear and a curvilinear direction, substantially as described, for the purposes specified.

8. In a milling-fixture for slide-lathes, the combination, with a rotatory work-carrying arbor, mechanism, substantially such as described, for rotating said arbor, and a support for said mechanism adapted to be swung about the axis of said arbor and to be fastened against and set free for being so swung, of an index mechanism connected to said operating mechanism for rotating said arbor, composed of an index-wheel of suitable construction, free to rotate on said arbor, but attachably and detachably secured to said support for said operating mechanism, and a pin attached to said arbor to act as an index-pin in connection with and to be engaged with and disengaged from said index-wheel, and adjustable spacing-jaws swinging upon said arbor, all substantially as described, for the purpose specified.

9. In a milling-fixture for slide-lathes, a rotatory work-carrying arbor turning in suitable bearings, $R^7$, a sleeve, $R^{20}$, surrounding said arbor and incased in said bearings, split to be tightened about and loosened from said sleeve, a worm-wheel, $R^{18}$, secured to said arbor, and an operating-worm, $S^2$, meshing worm-gear $R^{18}$ and having its support or bearings carried by said sleeve, substantially as described, for the purpose specified.

10. In a milling-fixture for slide-lathes, a rotatory work-carrying arbor turning in suitable bearings, $R^7$, a sleeve, $R^{20}$, surrounding said arbor and incased in said bearings, split to be tightened about and loosened from said sleeve, a worm-wheel, $R^{18}$, secured to said arbor, an operating-worm, $S^2$, meshing worm-gear $R^{18}$ and having its support or bearings carried by said sleeve, an index-wheel, $T^2$, loose on said arbor, but attachably and detachably secured to said support, and an index-pin, $T^3$, to swing about said arbor and to engage said index-wheel, and spacing-jaws $T^5$ $T^6$, loose on said arbor and arranged to be adjusted as to each other and fixed in said adjustment, substantially as described, for the purpose specified.

11. In a milling-fixture for slide-lathes of otherwise suitable construction, spacing-jaws $T^5$ $T^6$, each of a separate collar, fastened together by a ring, $T^{14}$, attached to one and overlapping the other collar and binding the two together, substantially as described, for the purpose specified.

12. In a milling-fixture for slide-lathes of otherwise suitable construction, a rotatory work-carrying arbor turning in suitable bearings, $R^7$, a sleeve, $R^{20}$, surrounding said arbor and incased in said bearings, split to be tightened about and loosened from the same, having a shell-extension, $R^{19}$, a gear-wheel, $R^{18}$, secured to said work-carrying arbor and covered by said shell, and an operating worm or gear, $S^2$, meshing same, substantially as described, for the purpose specified.

13. In a milling-fixture for slide-lathes of otherwise suitable construction, a rotatory work-carrying arbor turning in suitable bearings, $R^7$, of a plate, $R^8$, secured to a curvilinear bar, $R^9$, moving in a curvilinear way, $R^{10}$, of a suitable plate or carrier, substantially as described, for the purpose specified.

14. In a milling-fixture for slide-lathes of otherwise suitable construction, a rotatory work-carrying arbor turning in suitable bearings, $R^7$, and having a worm-gear, $R^{18}$, in combination with a sleeve, $R^{20}$, surrounding said arbor and having shell $R^{19}$, covering the working-edge of said worm-gear, substantially as described, for the purpose specified.

15. In a milling-fixture for slide-lathes of otherwise suitable construction, a rotating work-carrying arbor turning in suitable bearings, $R^7$, and having a worm-gear, $R^{18}$, a sleeve, $R^{20}$, surrounding said arbor and having shell $R^{19}$, covering the working-edge of said worm-gear and made with a side extension, $R^{22}$, in combination with a block, $S^4$, secured in said extension and making a bearing for an arbor, $S^3$, and worm $S^2$, substantially as described, for the purpose specified.

In testimony whereof I have hereunto set my hand in the presence of two subscribing witnesses.

GEO. F. BALLOU.

Witnesses:
 ALBERT W. BROWN,
 FRANCES M. BROWN.